Patented Aug. 13, 1946

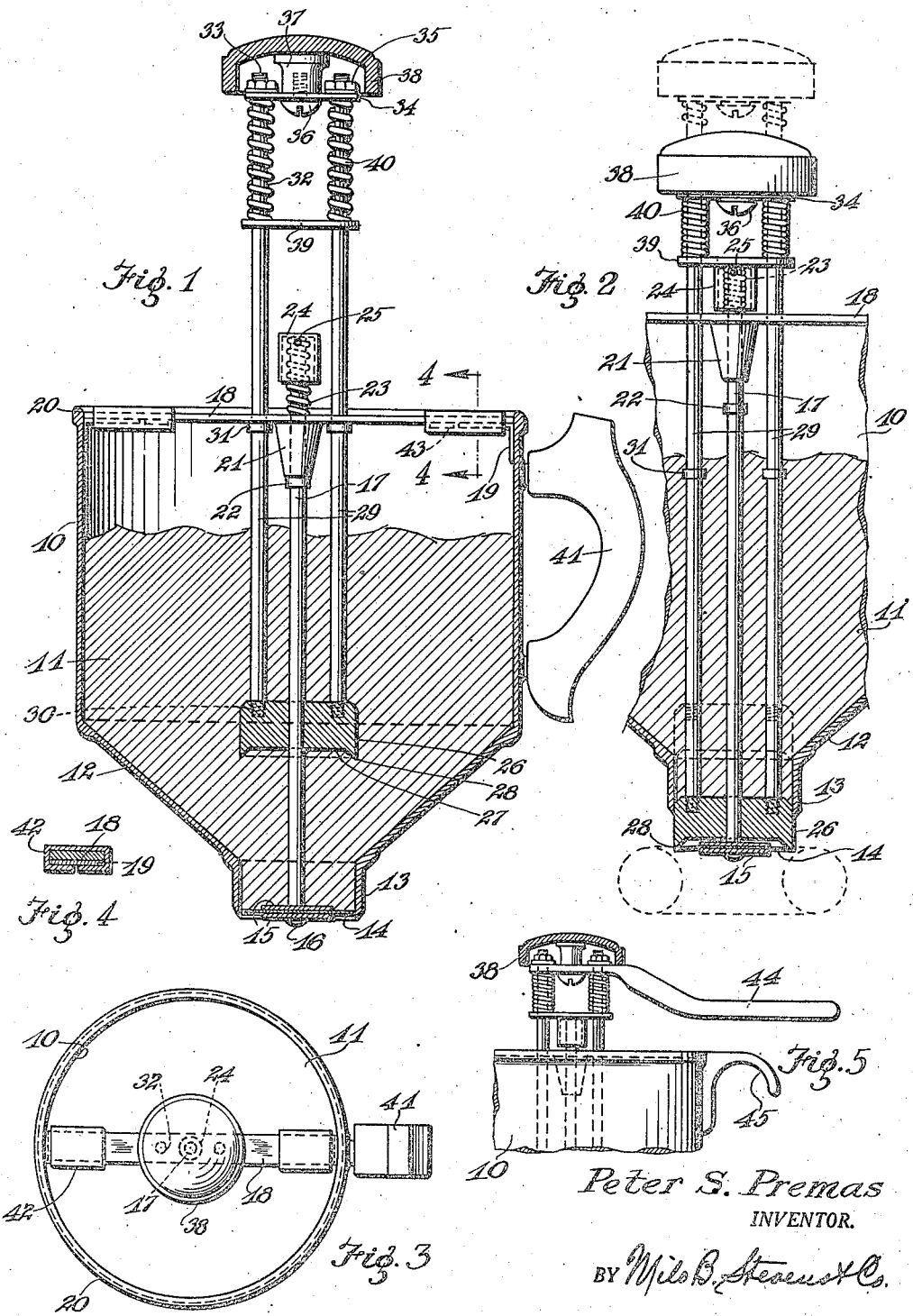

2,405,903

UNITED STATES PATENT OFFICE 2,405,903

DOUGHNUT FORMING MACHINE

Peter S. Premas, Chicago, Ill.

Application March 17, 1944, Serial No. 526,937

6 Claims. (Cl. 107—52)

My invention relates to kitchen or restaurant utensils employed for the shaping or cutting of dough or batter to form doughnuts and the like, and one object of the invention is to provide a machine for this purpose which is compact and light enough to be held in one hand and operated with the other.

A further object of the invention is to provide a machine of the above character which has a relatively large capacity for a hand utensil, enabling a single filling of dough to produce as many as six dozen doughnuts.

Another object of the invention is to design the novel machine with means to remove and form a fixed amount of the dough or batter each time the machine is operated, so that the size of the doughnuts and the amount of dough required for a given number of batch of them may be definitely or accurately determined.

A still further object of the invention is to confine the forming means to the center of the receptacle in which the dough is deposited, so that the surrounding portions of the dough may be free to move or settle as each doughnut is formed.

An additional object of the invention is to include a mechanism in the machine which acts on the principle of a plunger, with a special control to form and dispense a doughnut every time the plunger is given a downstroke.

An important object of the invention is to design the machine for the easy detachment and removal of its mechanism, facilitating the thorough cleaning thereof as well as the dough receptacle to maintain the machine in a highly sanitary condition.

Another object of the invention is to construct the machine with a minimum number of necessary and sturdy parts, whereby to render the manufacture of the machine economical and render it durable over a long period of use.

With the above objects in view and any others which may suggest themselves from the description to follow, a better understanding of the invention may be had by reference to the accompanying drawing, in which—

Fig. 1 is a vertical section of the machine in a position preparatory to the formation of a doughnut;

Fig. 2 is a repetition of the central portion of Fig. 1, indicating an intermediate position of working parts by means of dotted lines and the final position thereof by means of full lines;

Fig. 3 is a top plan view of Fig. 1, on a reduced scale;

Fig. 4 is a section on the line 4—4 of Fig. 1; and

Fig. 5 is a fragmental elevation of a modification, partly in section.

Referring specifically to the drawing, the machine is mainly in the form of a receptacle or hopper 10 for the dough or batter 11 from which the doughnuts are formed. The receptacle is preferably of the cylindrical form shown, although it may be square or polygonal in shape without prejudice to its use or operation. The receptacle is reduced conically at the bottom, as indicated at 12, to terminate with a throat 13 of relatively shallow cylindrical form.

The throat 13 receives a bottom closure on the inside in the form of a disc 14 which makes a sliding fit with the wall of the throat and is reinforced in the center by upper and lower plates 15. The assembly of the disc and plates is made fast by riveting—as indicated at 16—to the lower end of a vertical rod 17 located in the center of the receptacle 10. The rod is supported by a cross bar 18 spanning the top of the receptacle to normally maintain the disc 14 just inside the bottom of the throat 13 and lend the latter the form of a cup which contains an amount of dough sufficient to form one doughnut, whatever its prescribed size may be.

The cross bar 18 is supported endwise on corner angle brackets 19 secured at opposite points inside the rim 20 of the receptacle; and the bar is extended downwardly with a conical enlargement 21 at the center to form a slide bearing for the center rod 17. The latter carries a fixed collar 22 as a stop relative to the bearing 21 in response to the tension of a coil spring 23 carried by the part of the rod which projects above the cross bar 18, the spring bearing against the bottom of an inverted cap or cup 24 secured to the upper end of the rod by a cross pin 25. It is now apparent that the center rod is in its topmost position, but that the rod may be lowered by depressing the cup 24.

Means are provided accessory to the center rod 17 to act on the dough in a direction to form the doughnut. The main element of such means is a circular plunger 26 slidably centered on the rod 17 and of a diameter to be slidable in the throat 13 when depressed from the full-line position of Fig. 1 to that of Fig. 2. The plunger is countersunk in the bottom, as indicated at 27 to define an internally-beveled annular edge 28.

The plunger 26 is supported at the lower ends of a pair of vertical rods 29 located on opposite sides of the center rod 17, such lower ends being screwed into the top of the plunger as indicated at 30. The rods 29 also rise slidably through the cross bar 18 to the limit formed by fixed collars 31 according to the positions of the rods in Fig. 1. At a suitable height above the cross bar the rods 29 are reduced with flat inner sides as indicated at 32 and further reduced to form terminal screws 33. A tie plate 34 is perforated for the snug passage of the screws 33, these receiving securing nuts and washers 35, whereby to firmly secure the rods to the tie plate. The latter is in turn secured by a center screw 36 to the hub 37 of a cap or hood 38 of a size sufficient to amply cover the assembly of the rods 29.

The reduced portions 32 of the rods 29 receive a slidable cross-plate 39, and carry compression springs 40 between the same and the tie plate 34 with the primary effect of keeping the cross-plate seated against the shoulders at the bottoms of the said reduced portions. Normally, the assembly of the rods 29 may occupy the topmost position indicated in Fig. 1 or a lower position within the mass of dough 11 without causing any change in the same. However, when a doughnut is to be formed the action of the machine is instituted by downward pressure on the cap 38 with one hand while a handle 41 projecting from the side of the receptacle is held with the other hand.

Primarily, the spring 23 is of sufficient strength to hold the disc 14 as a bottom for the receptacle throat 13 despite the pressure induced by the descent of the plunger 26, since part of this pressure is transmitted or dissipated sidewise in the dough mass. However, when the plunger reaches the entrance of the throat, as indicated by dotted lines in Fig. 2, the knife-like rim 28 of the plunger cuts the dough in the throat off from the surrounding mass, confining such dough to the chamber formed by the plunger 26, the disc 14 and the wall of the throat. Now, the continued down pressure of the plunger is transmitted to the disc, which is thus forced to gradually drop out of the throat, allowing a ring of dough to escape from the latter marginally. As the plunger is further depressed to meet the disc, as seen in Fig. 2, the entire charge of dough is forced from the said chamber, swelling the surrounding dough ring to the desired size of the doughnut indicated by dotted lines in the same figure.

While the downstroke imposed on the plunger 26 is free until the cross-plate 39 reaches the cup 24 at the top of the center rod 17, such cross-plate recedes upwardly along the plunger rods 29 as the cap or hood 38 is pressed down further, compressing the springs 40. As the plunger approaches bottom, the cross-plate 39 bears on the cup 24 to compress the spring 23 within the same, so that ultimately all the springs are closely compressed and the cup 24 is about to meet the cross bar 18 and stop the further movement of the mechanism, so that the same appears as in Fig. 2.

The knife edge 28 of the plunger also acts with respect to the disc 14, securing a clean-cut inner edge for the formed doughnut. The flexibility of the disc makes it adaptable to possible slight deviations in the level or alinement of the plunger, whereby to secure full marginal contact with the knife edge 28 thereof.

While the mechanism described above is of open construction, it is conceivable that after its use bits of dough or deposits of flour may cling to or tend to clog some of the parts. The mechanism is therefore made to be removable as a unit from the receptacle, so that it may be placed under a hot water faucet or otherwise thoroughly cleaned. The mechanism is only carried by the cross bar 18; and the latter is held to the angle brackets 19 by a pair of split sleeves 42 which release the brackets when slid inwardly to a sufficient extent. The cross bar and parts associated with it may then be raised out of the receptacle, incidentally leaving the interior thereof clear and fully accessible for cleaning. The cross bar 18 carries integral strips 43 underneath. These are of a thickness to tension the bottom flanges of the sleeves as they are backed off the angle brackets, so that the sleeves hold snugly to the cross bar while it is being handled.

It will be evident from the above description that I have provided a light and handy appliance for the purpose stated. While it is suggestive of a utensil, it contains a mechanism which gives it the character of a machine, since the dough feeding and forming actions are positive and precise. The principle of the feed isolates a prescribed amount of the dough for each forming operation, which factor makes it easy to determine the quantity of the filling for a desired number of the resulting product. The appliance need be not much larger than the common flour sifter for use in the home or in lunch rooms. However, where a greater capacity is desired, such as in busy restaurants or plant lunch rooms, the receptacle may be suspended or otherwise independently supported. In such event it is preferable to extend the plunger tie plate 34 with a side lever 44, as in Fig. 5, and substitute a hook 45 for the handle 41, the illustration suggesting that the lever has been pulled down close to the hook. Further, the forming unit of the plunger mechanism positively and uniformly dispenses the dough charge to the full annular doughnut formation, cutting the same off cleanly. Finally, the novel appliance is an article of few parts, is easy to operate, and is quickly separable for cleaning access and facility.

While I have described the invention along specific lines, various minor changes or refinements may be made therein without departing from its principle, and I desire to consider such changes and refinements as coming within the scope and spirit of the appended claims.

I claim:

1. A doughnut forming machine comprising a receptacle for the doughnut dough and having a bottom discharge throat, a closure disc in the lower end of the throat, a plunger in the receptacle designed to be slidable in the throat and normally adapted to engage the dough in the receptacle at a point spaced above the throat, means to depress the plunger into the latter to the extent of confining the dough in said throat, other means actuated by the action of the plunger to lower said disc from the throat before the plunger enters the same to cause the confined dough to issue about said lower end in a surrounding mass, said plunger being further depressible to lower said disc further and meet the same, the outer bottom edge of the plunger contacting the edge of the disc, and said bottom edge being beveled to substantial sharpness to cut said mass cleanly from the disc.

2. A doughnut forming machine comprising a receptacle for the doughnut dough and having a bottom discharge throat, a closure disc in the lower end of the throat, a plunger in the receptacle designed to be slidable in the throat and normally in spaced position above the same, means to depress the plunger into the throat, other means actuated by the action of the plunger to lower said disc from the throat, said depressing means comprising a support in the mouth of the receptacle, bearings carried by the support, a pair of laterally-spaced rods rising from the plunger through the bearings, a headpiece joining the upper ends of the rods, a cross-plate slidable on the rods and seating on stops formed in the same, compression springs coiled on the rods between the headpiece and the cross-plate, and an abutment on the support in the descending path of the cross-plate when the headpiece is depressed to a partial extent, the springs yielding to the further depression of the headpiece.

3. A doughnut forming machine comprising a receptacle for the doughnut dough and having a bottom discharge throat, a closure disc in the lower end of the throat, a plunger in the receptacle designed to be slidable in the throat and normally in spaced position above the same, means to depress the plunger into the throat, other means actuated by the action of the plunger to lower said disc from the throat, said other means comprising a rod rising from the disc, a support in the mouth of the receptacle and having a bearing for the upward passage of the rod, an abutment carried by the upper end of the rod in a downward path of said plunger depressing means, and a spring between the abutment and said support to resist the lowering of the disc.

4. A doughnut forming machine comprising a receptacle for the doughnut dough having a bottom discharge throat, a closure disc in the lower end of the throat, a rod secured to said disc and extending axially of the receptacle, a support carried by said receptacle adjacent to the upper end thereof, a cap having a spring, said cap secured to said rod and said spring resting on said support resiliently mounting the upper end of said rod, a plunger slidable in the throat and having an actuating head, said head being normally out of contact with and spaced above said cap.

5. The structure of claim 4, the bottom of said plunger being countersunk and having an internally bevelled edge.

6. The structure of claim 4, the actuating head of said plunger comprising a spring-pressed cross bar engageable with said spring cap.

PETER S. PREMAS.